United States Patent [19]

Naka et al.

[11] 4,102,218
[45] Jul. 25, 1978

[54] FASTENING DEVICE FOR TILTABLE STEERING MECHANISMS

[75] Inventors: Mitsuru Naka; Masao Sakamoto, both of Toyota, Japan

[73] Assignee: Toyota Jidosha Kogyo Kabushiki Kaisha, Toyota, Japan

[21] Appl. No.: 803,270

[22] Filed: Jun. 3, 1977

[30] Foreign Application Priority Data

Dec. 24, 1976 [JP] Japan .................... 51-174866[U]

[51] Int. Cl.² ................ B62D 1/18; G05G 5/18
[52] U.S. Cl. .............................. 74/493; 74/540
[58] Field of Search ................ 74/493, 534, 540

[56] References Cited

U.S. PATENT DOCUMENTS

| | | |
|---|---|---|
| 3,167,971 | 2/1965 | Zeigler et al. ............... 74/493 |
| 3,302,478 | 2/1967 | Pauwels ...................... 74/493 |
| 3,355,962 | 12/1967 | Gerdes et al. ............... 74/493 |
| 3,421,386 | 1/1969 | Sippel ......................... 74/493 |

*Primary Examiner*—Allan D. Herrmann

*Attorney, Agent, or Firm*—Stevens, Davis, Miller & Mosher

[57] ABSTRACT

In a fastening device for a tiltable steering mechanism having a stationary bracket mounted on the vehicle body structure and a movable bracket secured to a tubular housing and pivoted at its opposing arms to the stationary bracket for permitting angular adjustment of a tiltable steering shaft journalled within the tubular housing, a toothed portion is unitedly provided on one of the arms of the movable bracket and a latch member is pivoted to a portion of the stationary bracket to be engaged with the toothed portion in the locked position. The fastening device comprises a manual lever pivoted to the stationary bracket coaxially with the movable bracket and operatively connected with the latch member to move the latch member toward the unlocked position, an engaging element provided on the lever and engageable with the bottom face of the latch member to hold the latch member in the locked position when the lever is released and a spring for biasing the lever to maintain the engagement of the latch member against the toothed portion of the movable bracket.

10 Claims, 7 Drawing Figures

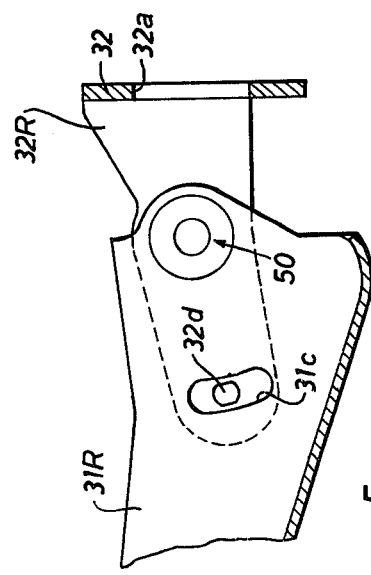
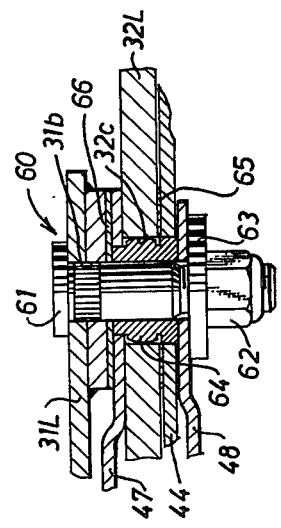
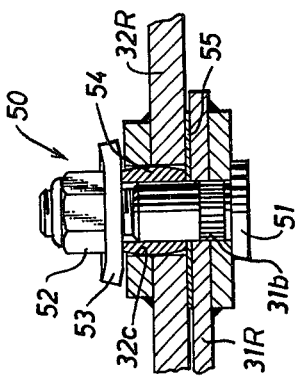

FASTENING DEVICE FOR TILTABLE STEERING MECHANISMS

BACKGROUND OF THE INVENTION

The present invention relates to a tiltable steering mechanism for automotive vehicles, and more particularly to a fastening device for a tiltable steering mechanism of the type in which the steering wheel may be tiltably adjusted into a number of operable driving positions in accordance with the driver's physique.

SUMMARY OF THE INVENTION

The primary object of the present invention is to provide a fastening device for the tiltable steering mechanism, in which the whole component parts are compactly mounted on the steering mechanism with sufficient mechanical strength against a heavy impact load exerted onto the steering wheel.

In a preferred embodiment of the present invention, the above object is accomplished by providing a fastening device for a tiltable steering mechanism including a steering shaft tiltably connected to steering gear means, a tubular housing having the steering shaft journalled therein, and a steering wheel mounted on the steering shaft, the fastening device comprising a stationary bracket mounted on a portion of the vehicle body structure and having a pair of opposing arms; a movable bracket secured to the tubular housing and having a pair of opposing arms coupled and pivoted to the pair of arms of the stationary bracket for permitting angular adjustment of the steering shaft and the steering wheel; a toothed portion united with one of the arms of the movable bracket; a latch member pivoted to a portion of the stationary bracket and movable between a locked position in which the latch member engages the toothed portion to lock the steering wheel in a desired angular position and an unlocked position in which the latch member disengages from the toothed portion to permit free movement for angular adjustment of the steering wheel; a munual lever pivoted to the stationary bracket coaxially with the movable bracket to be moved perpendicularly with respect to the pivot axis and being operatively connected with the latch member to move the latch member toward the unlocked position; an engaging element provided on the manual lever and engageable with the bottom face of the latch member to hold the latch member in the locked position when the manual lever is released; and resilient means for biasing the manual lever to maintain the engagement of the latch member against the toothed portion of the movable bracket; whereby when the manual lever is operated against biasing of the resilient means, the engaging element is separated from the latch member to permit movement of the latch member from the locked position to the unlocked position.

To operatively connect the latch member to the manual lever, the latch member may be provided at a free end thereof with a lateral pin and the manual lever may be provided thereon with a part circumferentially extending slot to receive the lateral pin therein, the slot being defined about a center located at the engaging element, whereby when the manual lever is operated against biasing of the resilient means, the latch member is moved to the unlocked position from the locked position by engaging the lateral pin against the inside face of the slot. Further, the engaging element may be a roller cam pivoted to a portion of the manual lever to be rotatably engaged with the bottom face of the latch member.

In the fastening device, spring means may preferably be interconnected to the stationary and movable brackets to move the steering wheel into a remote position upwardly with respect to the driving position when the roller cam is separated from the latch member by operating the manual lever. Furthermore, to restrict upward movement of the steering wheel, the stationary bracket is provided at the other arm thereof with a part circumferentially extending slot defined about a center located at the pivot axis and the movable bracket is provided at the other arm with a lateral pin received within the slot of the stationary bracket.

BRIEF DESCRIPTION OF THE DRAWINGS

Additional objects and advantages of the present invention will be more readily apparent from the following detailed description of preferred embodiments thereof when taken together with the accompanying drawings in which:

FIG. 4 is a partially enlarged side view illustrating a connecting portion of the first and second brackets shown in FIG. 3;

FIGS. 5 and 6 are enlarged cross-sectional views respectively illustrating pivot portions of the first and second brackets shown in FIG. 3.

DESCRIPTION OF THE PREFERRED EMBODIMENTS

Figure 1:
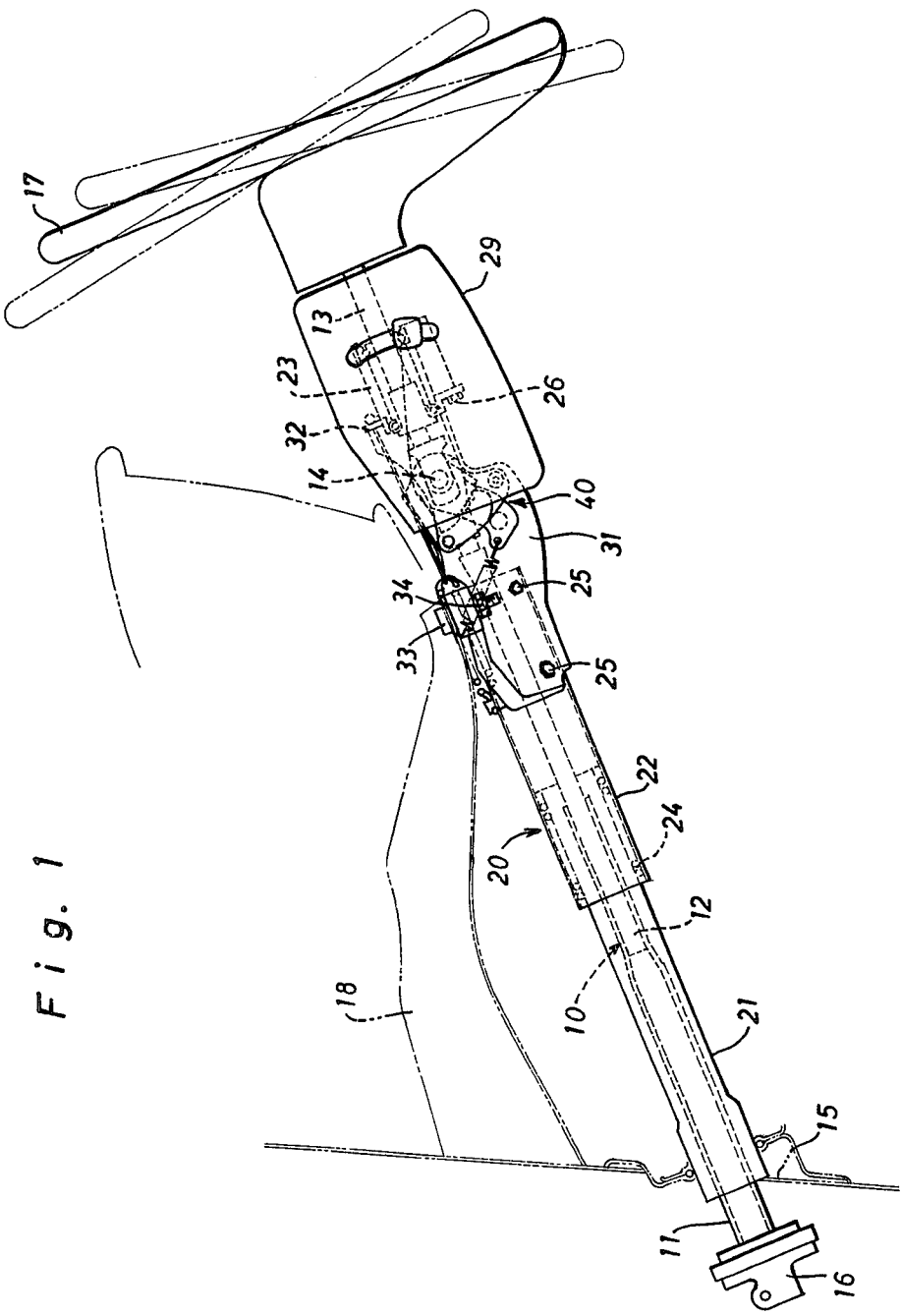
FIG. 1 is a side view of a preferred embodiment of a tiltable steering wheel assembly in accordance with the present invention.

Referring now to the drawings, particularly to FIG. 1, there is illustrated a steering shaft 10 which comprises a tubular lower shaft 11, a middle shaft 12 connected to the lower shaft 11, and an upper shaft 13 connected to the middle shaft 12 through a universal joint 14. The lower shaft 11 extends outward through a toe board 15 of the vehicle compartment and is connected at its lower end to a steering gear means (not shown) through a flexible coupling 16. The upper portion of the lower shaft 11 has a rectangular cross-section and is connected to the lower portion of the middle shaft 12 in an axially slidable and torque transmissible way. A steering wheel 17 is firmly mounted on the upper end of the upper shaft 13.

A column tube assembly 20 comprises a first tubular housing 21, a second tubular housing 22 and a third tubular housing 23. The first tubular housing 21 surrounds the lower shaft 11 therein and is anchored at its lower end to the toe board 15. The upper portion of the first tubular housing 21 is coupled with the second tubular housing 22 through a balltype impact energy absorbing means 24. The second tubular housing 22 surrounds the middle shaft 12 and is supported by a stationary supporter 18 by way of a first or stationary bracket 31 which is secured on the upper outer periphery of the second tubular housing 22 by fastening bolts 25. The stationary supporter 18 is firmly mounted on the toe board 15 under an instrument panel of the vehicle body.

Within the third tubular housing 23, the upper steering shaft 13 is rotatably supported by way of a pair of bearings 27 and 28. The third tubular housing 23 is integrally provided with a second or movable bracket 32 which is firmly connected to the lower end of the third tubular housing 23 by fastening bolts 26 and is pivoted to the stationary bracket 31, as described hereinafter in detail. Further, the third tubular housing 23 and the movable bracket 32 are housed within a breakable column cover 29.

Figure 2:
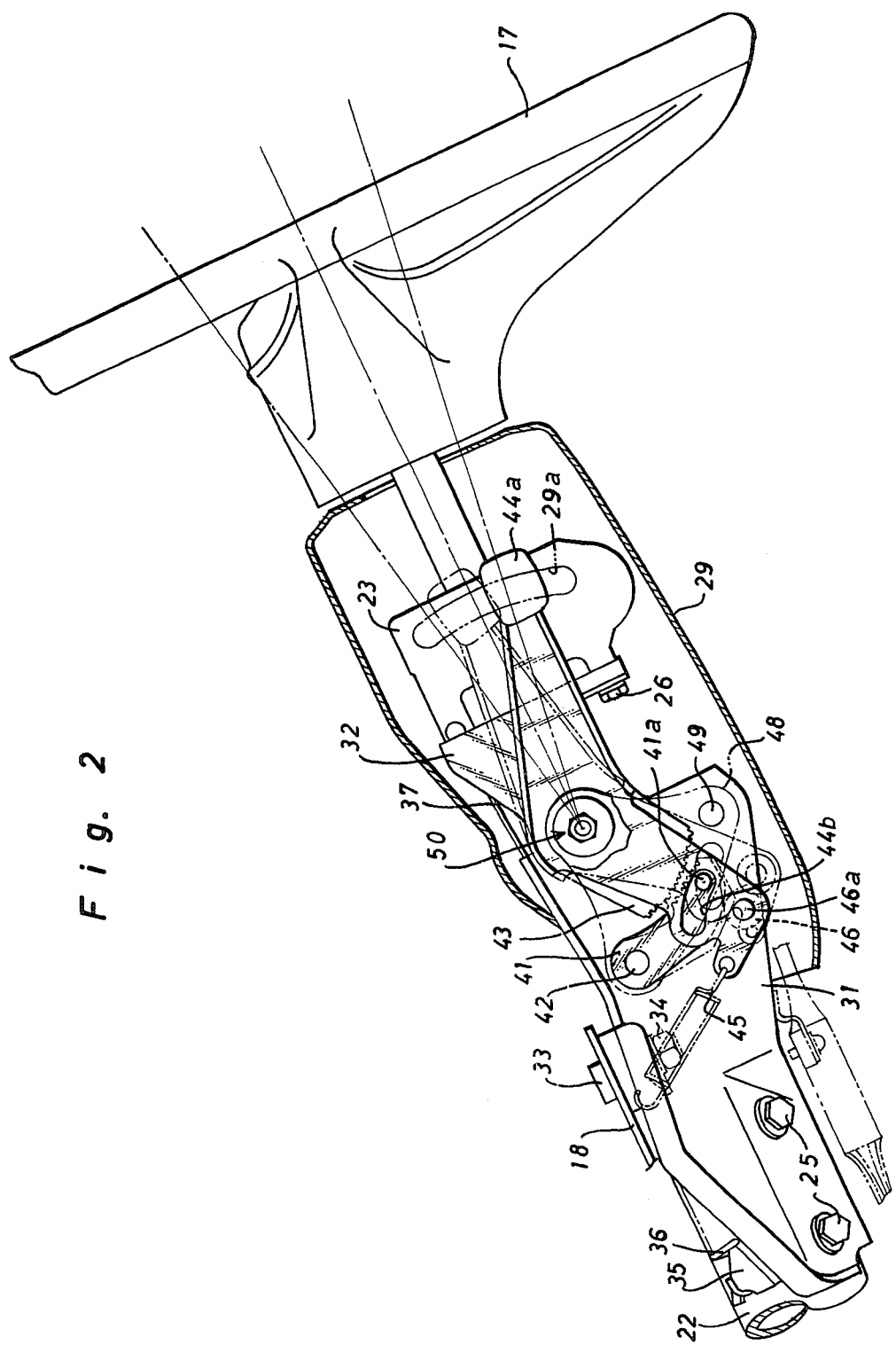
FIG. 2 is an enlarged side view of a portion of the tiltable steering wheel assembly shown in FIG. 1.
Figure 3:
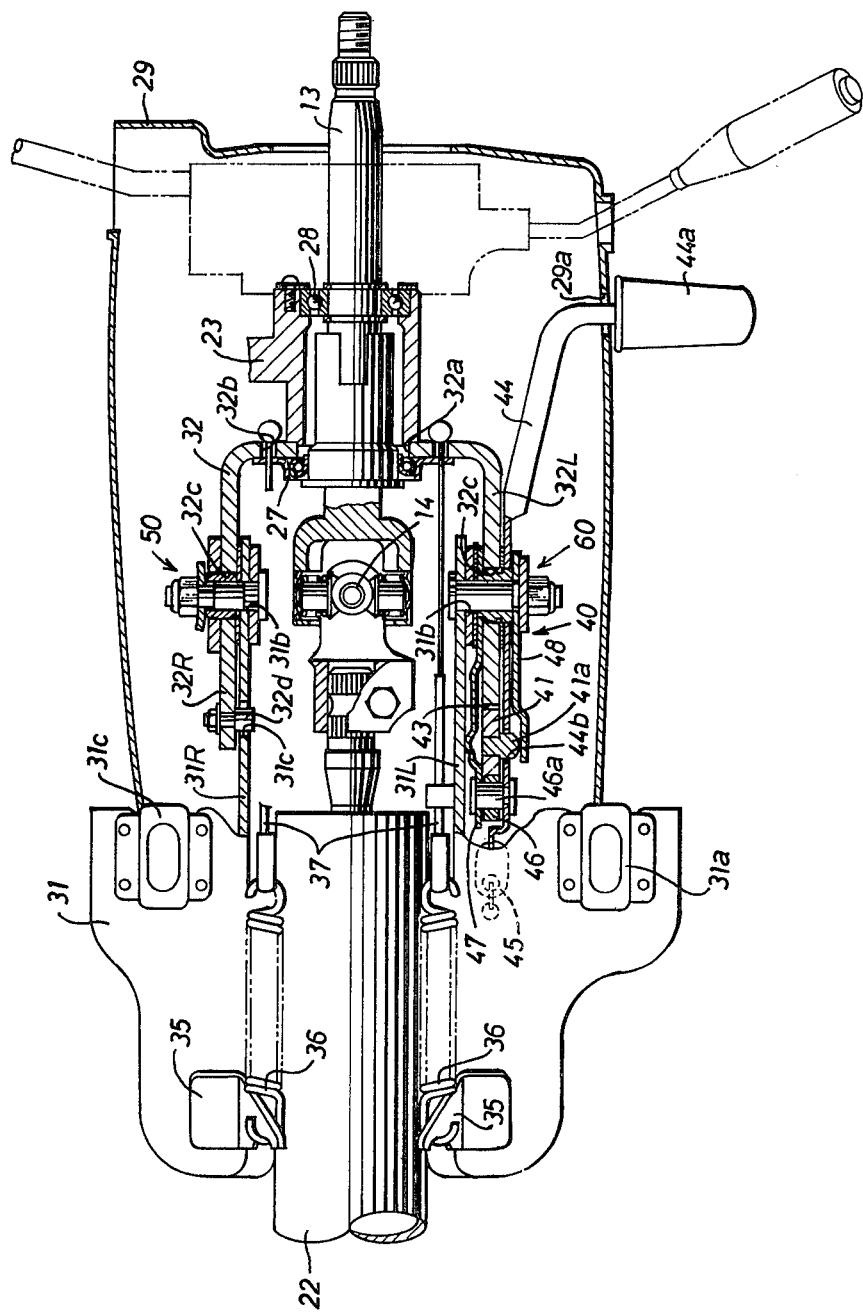
FIG. 3 is a partially broken and enlarged plan view of a portion of the tiltable steering wheel assembly shown in FIG. 1.

As illustrated in FIGS. 2 and 3, the first stationary bracket 31 includes a U-shaped body portion with a pair of lateral flanges, and a pair of vertical arms 31L and 31R extending upwardly from the body portion. The lateral flanges of the first bracket 31 are provided with a pair of mounting portions 31a, as shown in FIG. 3, to be secured under the stationary supporter 18. On the left arm 31L, as shown in FIG. 2, a latch member 41 is pivoted by a lateral pin 42 to be moved up and down, while on the right arm 31R, as shown in FIG. 4, a part circumferentially extending slot 31c is provided which is defined about a center located at a right pivot means 50. Thus, the second tubular housing 22 is firmly supported by the stationary supporter 18 in such a manner that the first bracket 31 is secured at the mounting portions 31a to the bottom face of the supporter 18 by bolts 33 and nuts 34.

The second movable bracket 32 is formed in a U-shape, as shown in FIG. 3, and has a through hole 32a to support the upper steering shaft 13 and a pair of spring receiver holes 32b. A left vertical arm 32L of the movable bracket 32 is provided at the free end thereof with a toothed portion 43 to be engaged with the latch member 41, as shown in FIG. 2, while a right vertical arm 32R of the movable bracket 32 is integrally provided at the free end thereof with a stopper bolt 32d, as shown in FIG. 3. The stopper bolt 32d is inserted into the slot 31c of the first bracket 31, as clearly shown in FIG. 4, to regulate vertical swinging movements of the second movable bracket 32. The second movable bracket 32 is assembled with the first bracket 31 in such a manner that the arms 32R and 32L of the second bracket 32 overlap the arms 31R and 31L of the first bracket 31. Thus, the arms 32R and 32L of the second bracket 32 are respectively pivoted to the arms 31R and 31L of the first bracket 31 by the right pivot means 50 and a left pivot means 60.

As shown in FIG. 5, the right pivot means 50 comprises a lateral pivot bolt 51, a lock nut 52, a washer 53, a sintered metal brush 54 having a spherical face, and a spacer 55 made of a spring steel plate. The pivot bolt 51 is inserted through a pivot hole 31b of the right arm 31R and the spacer 55 into the metal brush 54 which is retained within a pivot hole 32c of the right arm 32R. The lock nut 52 is fastened on the outer end of the pivot bolt 51 through the washer 53. Thus, the metal brush 54 and the spacer 55 are fixed to the right arm 31R so that the right arm 32R of the movable bracket 32 can be tilted around the spherical face of the metal bush 54 in the vertical direction.

The left pivot means 60 comprises a lateral pivot bolt 61, a lock nut 62, a washer 63, a sintered metal bush 64 having a spherical face and a pair of bearing portions, and a pair of spacers 65 and 66 respectively made of a spring steel plate. The pivot bolt 61 is inserted through the pivot hole 31b of the left arms 31L, the inner spacer 66 and a reinforcement plate 47 into the metal bush 64 which is retained within a pivot hole 32c of the left arm 32L. The lock nut 62 is fastened on the outer end of the pivot bolt 61 through the outer spacer 65, a manual lever 44, a reinforcement plate 48 and the washer 63. Thus, the reinforcement plate 48, the metal bush 64 and the inner spacer 66 are fixed to the left arm 31L so that the left arm 32L of the movable bracket 32 can be tilted around the spherical face of the metal bush 64 in the vertical direction. Further, the manual lever 44 and the reinforcement plate 47 are rotatably assembled on the respective bearing portions of the metal bush 64.

With the above-mentioned pivot means 50 and 60, each axis of the lateral pivot bolts 51 and 61 is aligned on a horizontal common axis passing through the center of the universal joint 14. In assembling process, even if the pivot bolts 51 and 61 may not be aligned on the common axis, the movable bracket 32 can be assembled with the stationary bracket 31 due to spherical guides of the respective metal bushes 54 and 64.

In a fastening device 40 assembled on the left side of the stationary and movable brackets 31 and 32, as shown in FIGS. 2 and 3, the latch member 41 is operatively connected to the manual lever 44 to be selectively engaged with the toothed portion 43 of the movable bracket 32. The manual lever 44 is rotatable on the outer bearing portion of the metal bush 64 perpendicularly with respect to the horizontal common axis and is biased clockwisely in FIG. 2 by a tension coil spring 45. The spring 45 is stretched between a portion of the stationary bracket 31 and a lower portion of the manual lever 44. An upper portion of the manual lever 44 protrudes outward through a part circumferentially extending slot 29a of the column cover 29 and is provided thereon with a grip 44a. The slot 29a is defined about a center located at the right pivot means 50.

The manual lever 44 is further provided on the lower end thereof with a lateral pin 46a secured at its both ends to the manual lever 44 and the reinforcement plate 47. Between the manual lever 44 and the reinforcement plate 47, a roller cam 46 is journalled on the lateral pin 46a to be engaged with the bottom face of the latch member 41. Thus, when the manual lever 44 is in its locked position shown by solid lines of FIG. 2, the roller cam 46 engages the bottom face of the latch member 41 due to tension of the spring 45 to hold engagement of the latch member 41 against the toothed portion 43 of the movable bracket 32. The manual lever 44 is also provided on the lower portion thereof with a part circumferentially extending slot 44b defined about a center located at the lateral pin 46a. Within the slot 44b, inserted is a lateral pin 41a which is secured to a lower portion of the latch member 41 and extends outwardly. Thus, when the manual lever 44 is moved counterclockwise against tension of the spring 45, the roller cam 46 is separated from the latch member 41 and simultaneously the pin 41a of the latch member 41 is forcibly moved down due to engagement with the upper inside surface of the slot 44b resulting in disengagement of the latch member 41 from the toothed portion 43 of the movable bracket 32. The reinforcement plate 48 shown with an imaginary line in FIG. 2 has a substantial triangular shape and is secured at its three corners to the stationary bracket 31 by the pivot means 60, the lateral pin 42 and a fastening pin 49 respectively.

As clearly shown in FIG. 3, the second bracket 32 is biased upward against the first bracket 31 by a pair of tension coil springs 36 which are engaged at their one ends with hooks 35 secured on the flanges of the first bracket 31 and engaged at their other ends with the spring receiver holes 32b of the second bracket 32 by way of steel wires 37.

When the fastening device 40 is in the locked position, the grip 44a of the manual lever 44 is located in the downward position and the roller cam 46 is engaged with the bottom face of the latch member 41 due to biasing of the spring 45 to maintain the engagement of the latch member 41 against the toothed portion 43 of the movable bracket 32. Thus, the movable bracket 32 is locked at a selected angular position with respect to the first bracket 31 against upward biasing forces of the coil springs 36. In this condition, the upper shaft 13 supported by the tubular housing 23 is firmly held at a selected angle with respect to the middle shaft 12 so that the steering wheel 17 is held at a desired angle with respect to the driver.

When it is desired to adjust the angle of the steering wheel 17 with respect to the driver, the grip 44a of the manual lever 44 is pushed up against the tension spring 45. Then, as described previously, the roller cam 46 is separated from the latch member 41 and simultaneously the lateral pin 41a of the latch member 41 is forcibly moved down due to engagement with the upper inside surface of the slot 44b to disengage the latch member 41 from the toothed portion 43 of the movable bracket 32. Thus, the movable bracket 32 is released from the stationary bracket 31. In this adjustment, if the steering wheel 17 is free, the tension spring 36 will move upward the movable bracket 32 united with the tubular housing 23 around the pivot means 50 and 60. This moves up the steering wheel into a remote position upwardly with respect to the driving position. In this instance, the upward movement of the movable bracket 32 is restricted due to engagement of the stopper bolt 32d against the lower end of the slot 31c at the right side of the bracket 32.

Thus, the steering wheel 17 can be freely tilted downward to a desired angular position. Then, the upper steering shaft 13 is correspondingly tilted around the universal joint 14, and the second bracket 32 is also tilted downward around the pivot means 50 and 60. Thereafter, when the manual lever 44 is released, the latch member 41 is pushed up by the roller cam 46 to engage the latch member 41 against the toothed portion 43. This locks the fastening device 40 to firmly hold the steering wheel 17 at the selected angular position with respect to the driver.

Figure 7:
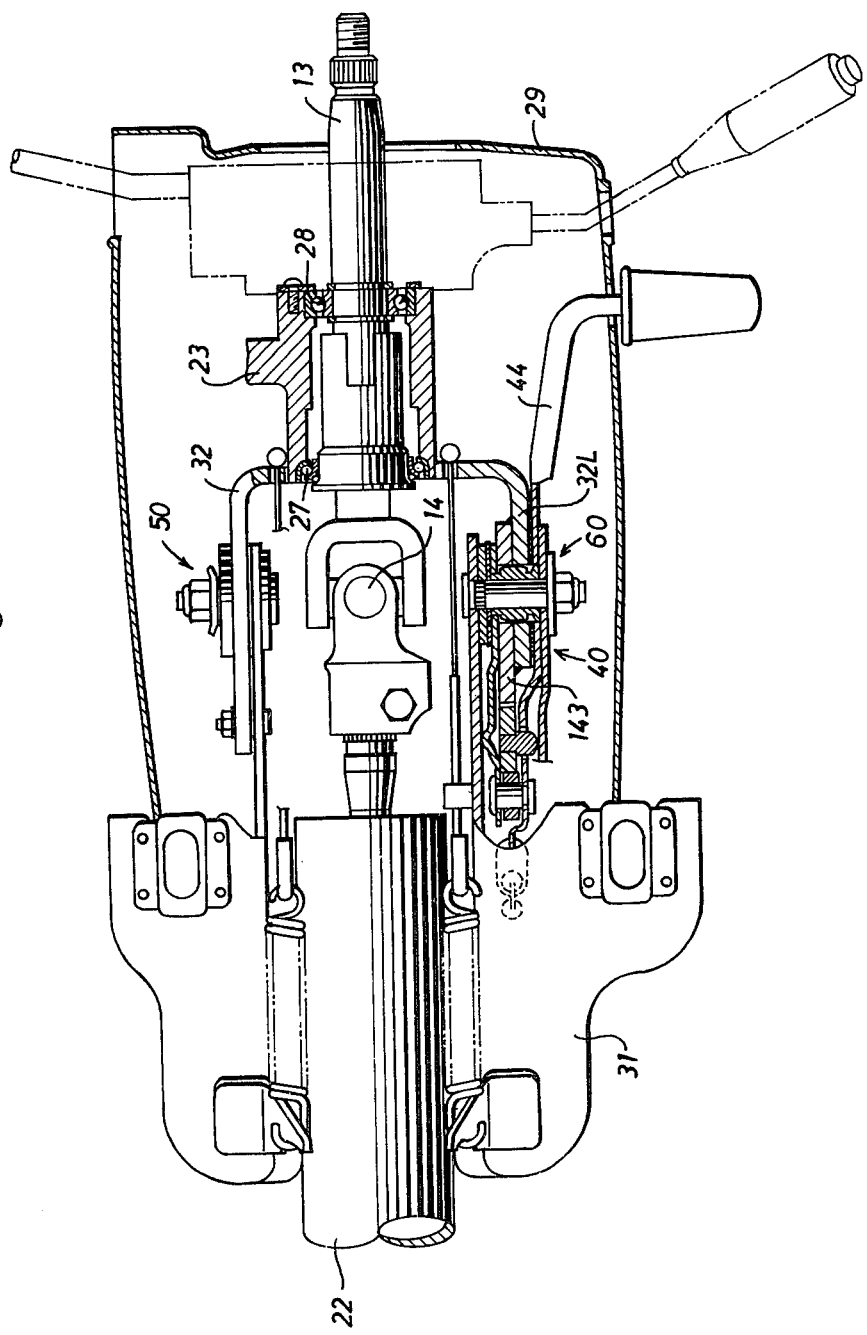
FIG. 7 is a partially broken and enlarged plan view of a modification of the tiltable steering wheel assembly.

FIG. 7 illustrates a modification of the present invention, wherein a toothed member 143 welded on the left arm 32L of the second bracket 32 corresponds to the toothed portion 32 of the left arm 32L previously described.

In the above embodiment, the roller cam 46 may be replaced with a cam secured to the inside face of the manual lever 44, or an incurved tab protruding inward from the lever 44.

Furthermore, in the above embodiment, the slot 44b and the lateral pin 41a may be respectively replaced with a lateral pin protruding inward from the manual lever 44 and a lateral protrusion of the latch member 41.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In an automotive vehicle, a fastening device for a tiltable steering mechanism including a steering shaft tiltably connected to steering gear means, a tubular housing having said steering shaft journalled therein, and a steering wheel mounted on said steering shaft, comprising:
   a stationary bracket mounted on a portion of the vehicle body structure and having a pair of opposing arms;
   a movable bracket secured to said tubular housing and having a pair of opposing arms coupled and pivoted to the pair of arms of said stationary bracket for permitting angular adjustment of said steering shaft and said steering wheel;
   a toothed portion united with one of the arms of said movable bracket;
   a latch member pivoted to a portion of said stationary bracket and movable between a locked position in which said latch member engages said toothed portion to lock said steering wheel in a desired angular position and an unlocked position in which said latch member disengages from said toothed portion to permit free movement for angular adjustment of said steering wheel;
   a manual lever pivoted to said stationary bracket coaxially with said movable bracket to be moved perpendicularly with respect to the pivot axis and being operatively connected with said latch member to move said latch member toward the unlocked position;
   an engaging element provided on said manual lever and engageable with the bottom face of said latch member to hold said latch member in the locked position when said manual lever is released; and
   resilient means for biasing said manual lever to maintain the engagement of said latch member against said toothed portion of said movable bracket;
   whereby when said manual lever is operated against biasing of said resilient means, said engaging element is separated from said latch member to permit movement of said latch member from the locked position to the unlocked position.

2. A fastening device for a tiltable steering mechanism as claimed in claim 1, wherein said engaging element is a roller cam pivoted to a portion of said manual lever to be rotatably engaged with the bottom face of said latch member.

3. A fastening device for a tiltable steering mechanism as claimed in claim 2, wherein said latch member is provided at a free end thereof with a lateral pin and said manual lever is provided thereon with a slot to receive said lateral pin therein, whereby when said manual lever is operated against biasing of said resilient means, said latch member is moved by engaging said lateral pin against the inside face of said slot to the unlocked position from the locked position.

4. A fastening device for a tiltable steering mechanism as claimed in claim 3, wherein said slot is a part circumferentially extending slot defined about a center located at said roller cam.

5. A fastening device for a tiltable steering mechanism as claimed in claim 1, wherein spring means is interconnected to said stationary and movable brackets to move said steering shaft and said steering wheel into a remote position upwardly with respect to the driving position when said engaging element is separated from said latch member by operating said manual lever.

6. A fastening device for a tiltable steering mechanism as claimed in claim 5, wherein a lateral pin is secured to the other arm of said movable bracket and said stationary bracket is provided at the other arm thereof with a part circumferentially extending slot to receive said lateral pin therein, said slot being defined about a center located at the pivot axis, whereby when said steering shaft and said sterring wheel are moved into the remote position, the upward movement of said steering wheel is restricted due to engagement of said lateral pin against the lower end of said slot.

7. A fastening device for a tiltable steering mechanism of a vehicle including a lower steering shaft connected to steering gear means, an upper steering shaft, a universal joint coupling said lower and upper steering shafts, a lower tubular housing having said lower steering shaft housed therein, an upper tubular housing having said upper steering shaft journalled therein, and a steering wheel mounted on said upper steering shaft, said fastening device comprising:
- a first bracket mounted on a portion of the vehicle body structure and having a pair of opposing arms, said lower tubular housing being supported by said first bracket;
- a second bracket secured to said upper tubular housing and having a pair of opposing arms coupled and pivoted to the pair of arms of said first bracket around a substantially horizontal axis passing through the center of said universal joint for permitting angular adjustment of said steering shaft and said steering wheel;
- a toothed member united with one of the arms of said second bracket;
- a latch member pivoted to a portion of said first bracket and movable between a locked position in which said latch member engages said toothed member to lock said steering wheel in a desired angular position and an unlocked position in which said latch member disengages from said toothed member to permit free movement for angular adjustment of said steering wheel;
- a manual lever pivoted to said first bracket to be moved perpendicularly with respect to the horizontal axis and being operatively connected with said latch member to move said latch member toward the unlocking position;
- an engaging element integrally provided on said manual lever and engageable with the bottom face of said latch member to hold said latch member in the locked position when said manual lever is released; and
- resilient means for biasing said manual lever to maintain the engagement of said latch member against said toothed member;

whereby when said manual lever is moved against biasing of said resilient means, said engaging element is separated from said latch member to permit movement to said latch member from the locked position to the unlocked position.

8. A fastening device for a tiltable steering mechanism as claimed in claim 7, wherein said latch member is provided at a free end thereof with a lateral pin and said manual lever is provided thereon with a part circumferentially extending slot to receive said lateral pin therein, said slot being defined about a center located at said engaging element, whereby when said manual lever is moved against biasing of said resilient means, said latch member is moved by engaging said lateral pin against the inside face of said slot to the unlocked position from the unlocked position.

9. A fastening device for a tiltable steering mechanism as claimed in claim 8, wherein at least a coil spring is stretched between said first and second brackets to move said upper steering shaft and said steering wheel into a remote position upwardly with respect to the driving position when said engaging element is separated from said latch member by operating said manual lever.

10. A fastening device for a tiltable steering mechanism as claimed in claim 9, wherein a lateral pin is secured to the other arm of said second bracket and said first bracket is provided at the other arm thereof with a part circumferentially extending slot to receive said lateral pin thereon, said slot being defined about a center located at the horizontal axis, whereby when said upper steering shaft and said steering wheel are moved into the remote position, the upward movement of said steering wheel is restricted due to engagement of said lateral pin against the lower end of said slot.

* * * * *